Oct. 7, 1969    R. B. WITTKE    3,471,377
METHOD FOR FORMING A SOLID ELECTROLYTE CAPACITOR
Filed Aug. 21, 1967

United States Patent Office 3,471,377
Patented Oct. 7, 1969

3,471,377
METHOD FOR FORMING A SOLID
ELECTROLYTE CAPACITOR
Raymond B. Wittke, Adams, Mass., assignor to Sprague Electric Company, North Adams, Mass., a corporation of Massachusetts
Filed Aug. 21, 1967, Ser. No. 662,159
Int. Cl. C23b 5/52; C23f 17/00
U.S. Cl. 204—37        5 Claims

ABSTRACT OF THE DISCLOSURE

Coating a non-anodized valve metal body with a semiconductive oxide coating, placing the coated body in an oxygen bearing fused salt bath and electrolytically forming a dielectric valve metal oxide layer between the interface of said body and the semiconductive oxide coating.

BACKGROUND OF THE INVENTION

This invention relates to a process for forming a solid electrolyte capacitor and more particularly to a method including anodization of a valve metal after deposition thereon of a semiconductive oxide.

A prior art process for preparing solid capacitors involves immersing a nonanodized tantalum foil in an aqueous solution of potassium permanganate and electrodepositing on the tantalum a manganese dioxide film. Thereafter forming a $Ta_2O_5$ dielectric layer between the manganese dioxide film and the tantalum metal by immersing the $MnO_2$ plated tantalum foil into an aqueous anodizing bath of boric acid. Following anodization, the unit is returned to the potassium permanganate solution and additional $MnO_2$ is deposited on the original plating. The unit is removed from the plating solution, rinsed, dried, and a cathode contact is applied to the $MnO_2$ completing the capacitor.

It has been determined that this process is limited to the use of tantalum foils since $MnO_2$ plating does not occur within the pores of a porous tantalum body. Further, it has been observed that the $MnO_2$ is not a very adherent film, and for this reason only specific anodizing baths can be used in order to avoid stripping of the semiconductive oxide. It has been reported that the $MnO_2$ layers deposited from a plating solution have a different physical characteristic from oxide layers formed by the pyrolytic decomposition of manganese nitrate. The former is an amorphous material whereas the latter is crystalline in nature. Crystalline semiconductors are believed to have better electrical characteristics than amorphous substances.

SUMMARY OF THE INVENTION

It is an object of the invention to present a process for preparing a solid electrolyte capacitor involving a fewer number of steps than the commercial process.

It is a further object of the present invention to present a process yielding more stable capacitors in greater yield.

It is still another object of the present invention to present a process which reduces the overall processing time.

This invention relates to a process for producing a solid electrolyte capacitor comprising electrolytically forming, in an oxygen-supplying fused salt bath, a dielectric valve metal oxide layer between the interface of a nonanodized valve metal electrode and a semiconductive oxide which coats said electrode.

In a more limited embodiment a nonanodized valve metal electrode is coated with a semiconductive oxide. The coated electrode is then anodized in an oxygen-supplying molten fused salt bath so as to form the dielectric oxide of said valve metal between said valve metal and said semiconductive oxide coating.

BRIEF DESCRIPTION OF THE DRAWING

This invention is illustrated by the accompanying drawing in which.

BRIEF DESCRIPTION OF THE INVENTION

Example I

Figure 1:
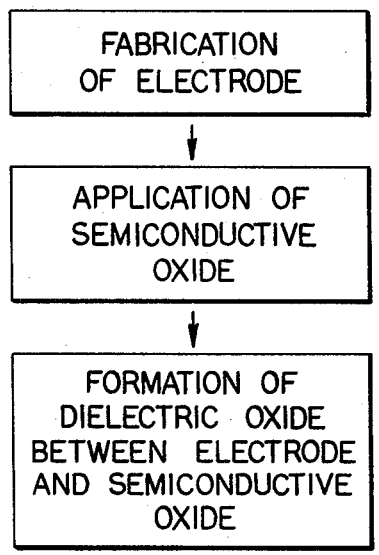
FIGURE 1 is a flow sheet of the process of the present invention and FIGURE 2 is a cross section of a capacitor formed by said process. Referring to the drawing, the electrode 10 is first fabricated from a valve metal by compressing and sintering valve metal particles to form a rigid porous sintered pellet. This constitutes the anode of the capacitor. A wire lead 13 is affixed to the pellet. The electrode is then coated with a semiconductive oxide 12. The electrode 10 is made the anode for forming a valve metal oxide layer 11 over the entire surface of the anode beneath the semiconductive layer 12.
Figure 2:
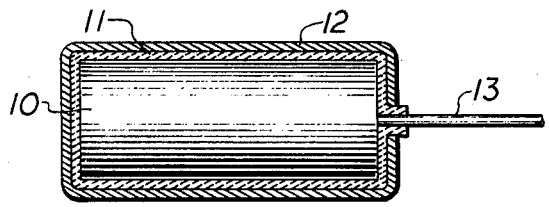

A series of 20 porous electrodes is produced by compressing and sintering tantalum particles. The electrodes are about 0.116 inch in diameter and 0.28 inch in length. A short length of tantalum wire is affixed to each body. The nonanodized electrodes are impregnated with a solution of manganous nitrate. The units are then heated to a temperature sufficient to pyrolyze the manganous nitrate to manganese dioxide. This temperature is preferably between 300 and 450° C. The sequence of impregnation of manganous nitrate followed by pyrolysis is repeated a number of times to yield a sufficient thickness of the semiconductive oxide.

The managenese dioxide coated electrodes are immersed in a molten fused salt bath of 66% $KNO_3$ and 34% $LiNO_3$. The temperature of the bath is about 350° C. The electrodes are made the anodes for forming a tantalum oxide layer over the entire surface of each body beneath the $MnO_2$ layer, including the internal surfaces of the interstices thereof. A constant current of 15 ma. per anode is used until an oxide film of 6 volts is reached. (By way of comparison, in order to form the same thickness of oxide film in an aqueous electrolyte a voltage stress of about 35 volts is required with the electrolyte at about 90° C.) The units are then held at voltage for about one hour during which time the current was allowed to age down.

The units are rinsed to remove the fused salt. Then a cathode contact is made via coatings of Aquadag and silver paint, and a conductive can. The completed units have the following characteristics:

Rating _____ 22 mfd.-10 v.
Capacitance _____ 20.85 mfd.
R×C, 120 cycles–10 kc. ____ 27 mfd.-ohms, 11 mfd.-ohms
Leakage current, median, range ___ 1.2 μA., 0.22–4.4 μA.

Example II

In a second example all material and conditions were the same as in Example I except that the units were formed to 22 volts. By way of comparison, in order to form the same thickness of oxide film in an aqueous electrolyte, a voltage stress of about 100 volts would be required with the electrolyte at about 90° C. The completed units had the following electrical characteristics:

Rating _____ 15μf. 20v.
Capacitance _____ 13.75μf.
R×C 120 cycles–10kc. _____ 22μf.-ohms,9μf.-ohms
Leakage current median, range _____ 6.3μA., 3.2 to 17

Example III

A series of 20 porous electrodes is produced by compressing and sintering aluminum particles. The electrodes average 0.122 inch in diameter and 0.25 inch in length. A short length of aluminum wire is affixed to each electrode. The non-anodized electrodes are impregnated with a solution of manganous nitrate. The units are then heated to a temperature sufficient to convert the nitrate to manganese dioxide. The decomposition temperature is preferably between 300 and 450° C.

The manganese dioxide coated electrodes are immersed in a molten fused salt bath of 66% $KNO_3$ and 34% $LiNO_3$. The temperature of the bath is about 350° C. The electrodes are made the anodes for forming an $Al_2O_3$ layer over the entire surface of each body beneath the $MnO_2$ layer, including the internal surfaces of the interstices thereof. A constant current of 30 ma. per anode is used until an oxide film of 100 volts is reached. The units are then held at voltage for about one hour, in which time the current was allowed to age down.

The units are then rinsed to remove the fused salt. Cathode contact is supplied by coating the units with Aquadag, silver paint, and a conductive can. The completed units have the following average electrical characteristics:

Rating _____ 1.2mfd.–20v.
Capacitance _____ 1.23mfd.
$R \times C$ _____ 65mfd-ohms
Leakage current _____ .93μA.

For the units of the preceding examples, the capacitance, $R \times C$ and leakage current levels are all about normal for the particular rating and this indicates that the dielectric oxide film is not grown at the expense of the adjacent $MnO_2$ layer. It is well-established by the experimental data that the dielectric oxide formation occurs because of oxygen mobility from the oxygen supplying fused salt bath through the $MnO_2$. The $MnO_2$ layer applied by thermal decomposition of the nitrate is hard and adherent as in the conventional commercial process. No stripping of this layer occurs in the molten electrolte bath. The semiconductive oxide is definitely crystalline in character and not amorphous.

The anodes contemplated herein may be any of the value metals, e.g., tantalum, aluminum, niobium, etc., in any form but particularly in the form of a porous, sintered pellet. The fused salt electrolyte may be any oxygen bearing salt or mixture of such salts typified by the mixture employed in the specific examples. The preferred anodization temperature range is between 300° C. to 450° C. The current density is dependent upon the temperature employed and generally is between 0.05 ma. to 20 ma. per square inch. The preferred density is about that used with a conventional electrolyte, i.e., about 1.5 ma. per square inch.

Since it is obvious that many modifications and changes may be made in the above-described details without departing from the spirit and scope of the invention, it is to be understood that the invention is not limited to said details except as set forth in the appended claims.

What is claimed is:
1. A proces for producing a solid electrolyte capacitor comprising applying a semiconductive oxide to a nonanodized value metal electrode and electrolytically forming, in an oxygen-supplying molten fused salt bath, a dielectric valve metal oxide layer between the interface of said electrode and the semiconductive oxide.
2. The process of claim 1 wherein said semiconductive oxide is applied by thermally decomposing manganous nitrate to manganese dioxide on said electrode.
3. The process of claim 2 wherein said fused salt is a mixture of $KNO_3$ and $LiNO_3$.
4. The process of claim 2 wherein said electrode is a porous pellet.
5. The process of claim 4 wherein said fused salt is a mixture of $KNO_3$ and $LiNO_3$ at about 350° C., said pellet is a tantalum pellet, and said dielectric oxide is $Ta_2O_5$.

References Cited
UNITED STATES PATENTS 3,239,436 3/1966 Hagiwara et al. _____ 204—32
3,277,553 10/1966 Wesolowski _____ 29—25.31

JOHN H. MACK, Primary Examiner

R. L. ANDREWS, Assistant Examiner

U.S. Cl. X.R.
204—38